P. M. HENGSTENBERG.
FLY TRAP.
APPLICATION FILED OCT. 3, 1916.

1,262,790.

Patented Apr. 16, 1918.

WITNESSES:
R. J. Fitzgerald.
Leslie Dean.

INVENTOR
Paul M. Hengstenberg.
BY
J. R. Langley,
ATTORNEY

UNITED STATES PATENT OFFICE.

PAUL M. HENGSTENBERG, OF WILKINSBURG, PENNSYLVANIA.

FLY-TRAP.

1,262,790.

Specification of Letters Patent.

Patented Apr. 16, 1918.

Application filed October 3, 1916. Serial No. 123,500.

*To all whom it may concern:*

Be it known that I, PAUL M. HENGSTENBERG, a subject of the Emperor of Germany, and a resident of Wilkinsburg, in the county of Allegheny and State of Pennsylvania, have invented a new and useful Improvement in Fly-Traps, of which the following is a specification.

My invention relates to fly traps and it has for its object to provide an arrangement that is simple in construction, neat in appearance and effective in operation to entrap and destroy flies in an entirely sanitary manner.

I provide a device of the character above described which comprises a container for formaldehyde or similar disinfectant, the vapor of which is fatal to flies or other insects. A gas chamber, which is located above the container, is provided with a translucent glass top to admit light and thereby attract the flies into the chamber. Upon being overcome by the fumes of the disinfectant, the flies fall into the liquid below. A casing of sheet metal or other opaque material renders the interior and contents of the trap invisible.

Figure 1:
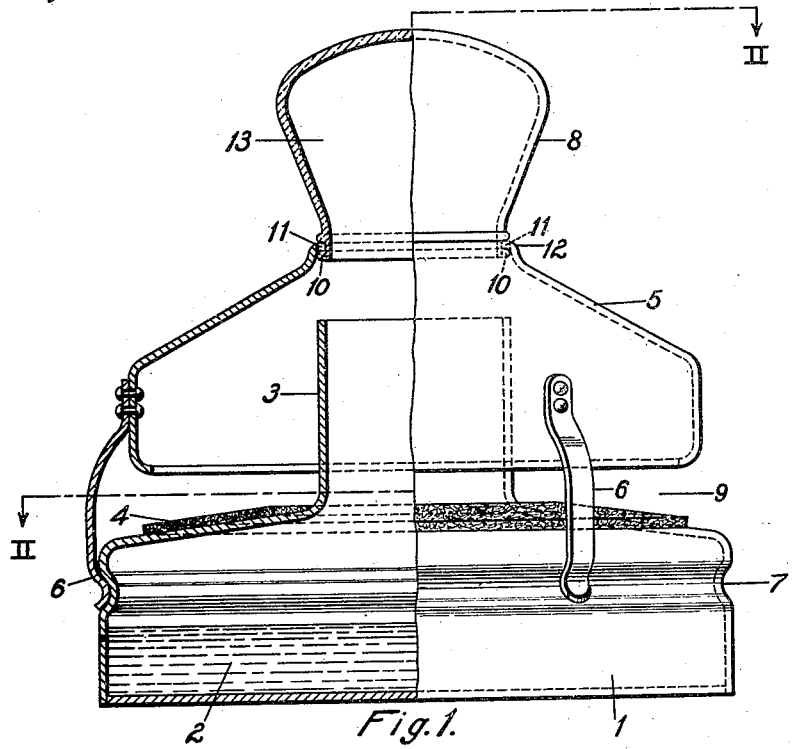
Figure 2:
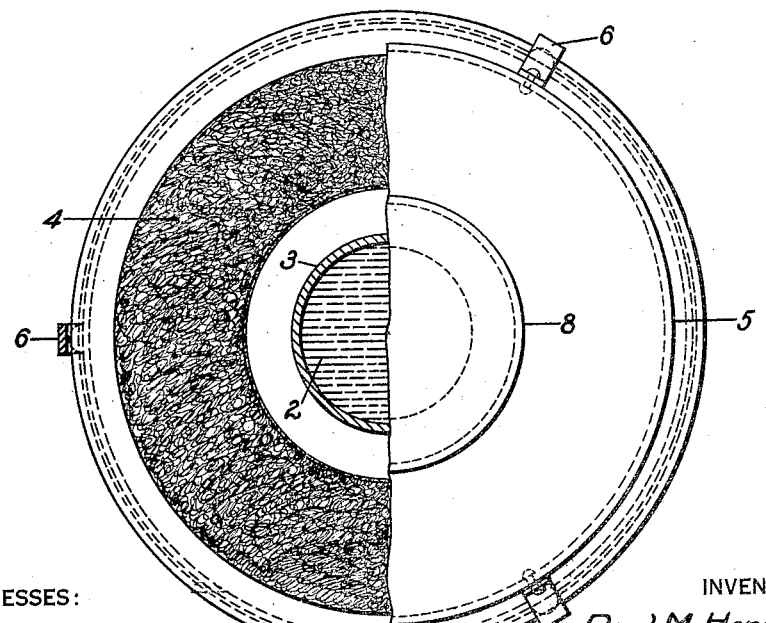

The details of my invention will be described in connection with the accompanying drawing in which Figure 1 is a side view, partially in elevation and partially in section, of a fly trap. Fig. 2 is a top view, partially in plan and partially in section on line II—II of Fig. 1, of the device of Fig. 1.

A cylindrical base member 1 constitutes a container for a liquid disinfectant indicated at 2, such as, for example, formaldehyde, or other suitable substance, the vapor of which is destructive to flies and other insects. The base member 1 is provided with a neck portion 3 through which vapor may be emitted and such insects as are overcome by the vapor may fall into the liquid disinfectant.

A ring 4 of absorbent material, such as felt or wicking, which surrounds the neck portion 3, receives the bait for attracting the flies into the trap. The bait may consist of sirup, stale beer or other suitable or convenient material.

A casing 5 of sheet metal, or other opaque material, is detachably secured to and spaced apart from the base member by means of three spring clips 6 which engage a circumferential groove 7. The casing is provided with a glass top 8 which is not transparent, but which admits sufficient light to attract the flies upward after they have entered the opening 9 between the base member and the casing. The top 8 and the casing 5 are detachably connected by means of lugs or projections 10 which, in assembling these parts, pass through notches 11 in the flange 12 of the casing. The top is then rotated until the lugs 10 are out of register with the notches 11.

The interior of the top 8 constitutes a chamber 13 in which the gas or vapor of the disinfectant collects. It will be noted that the diameter of the lower portion of the top 8 is slightly smaller than that of the neck of the container immediately below it. This arrangement insures that any flies falling from the gas chamber 13 will fall into the disinfectant.

In the operation of the device, flies will be attracted through the opening 9 by the bait upon the ring 4. After rising from the bait, the flies will be attracted by the light at the top of the trap and will enter the gas chamber 13. The vapor of formaldehyde is sufficiently destructive to flies to cause them to fall into the disinfectant below. The flies are thus retained under conditions which operate to effectively destroy them and, in addition, all germs that may be carried by them.

The vapors inside the trap thoroughly disinfect it at all times. The flies are invisible after entering the trap, thus rendering the latter free from the objectionable features attending the use of open or transparent devices.

It will be noted that the entire operation of the device is performed in a strictly sanitary manner which renders its use not only entirely safe, but frees it from odors or other disagreeable features. By reason of the detachable connection of the several parts, the trap my be easily inspected and the supply of disinfectant replenished at desired intervals. The above and other advantages will be apparent to those familiar with the art to which my invention appertains.

I claim as my invention:

1. In a fly trap, the combination with a container for a vaporizable substance, said container having an opening, of a chamber having an opening adjacent to that of said container but smaller relatively thereto in order to insure that objects falling from said chamber shall pass into said container, and inlet means for providing free access of insects to said chamber.

2. In a fly trap, the combination with a container for a vaporizable disinfectant, the fumes of which are destructive to insects, said container having an opening, of a chamber opening downward and adjacent to the opening in said container for collecting vapor from said disinfectant, and means forming an inlet whereby insects may have free access to said chamber and to said container.

3. In a fly trap, the combination with a container having a neck portion, a ring surrounding said neck portion for receiving bait and a cover member of opaque material spaced apart from the container to form an inlet to the bait, of a translucent member constituting a vapor chamber communicating with said inlet and with the neck portion of said container.

4. The method of destroying insects which consists in attracting them within a space filled with a destructive gas and causing their bodies to fall into disinfecting liquid.

5. The method of destroying insects which consists in attracting them into a chamber containing a destructive gas and then guiding their falling bodies into disinfecting liquid.

6. The combination with a container having an opening, and a casing member detachably connected to and spaced from said container to form a passageway, of a member connected to said casing member and forming a chamber above said container having an opening registering with the opening in said container and connected to said passageway and having, also, side walls inclined toward said opening.

7. The combination with a container for vaporizable material having an opening for the escape of vapors, of a member of translucent material forming a vapor-receiving chamber having an opening that registers with, but is smaller than, the opening in said container and having, also, side walls converging to said opening whereby bodies falling in said chamber are received by said container.

In testimony whereof, I have hereunto subscribed my name this 2nd day of Oct., 1916.

PAUL M. HENGSTENBERG.

Copies of this patent may be obtained for five cents each, by addressing the "Commissioner of Patents, Washington, D. C."